UNITED STATES PATENT OFFICE.

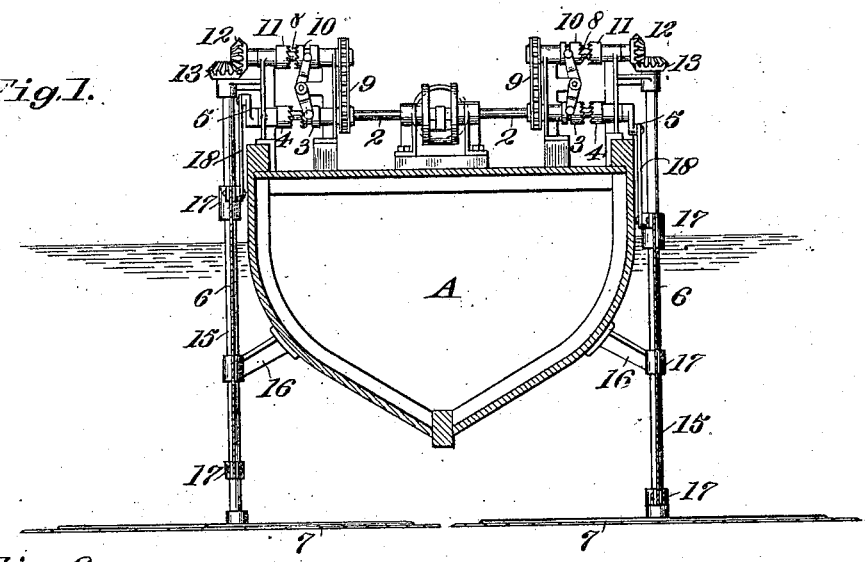

ARTHUR H. FIRMAN, OF LOS ANGELES, CALIFORNIA, ASSIGNOR TO AMERICAN POTASH CO., INC., OF LOS ANGELES, CALIFORNIA.

KELP-HARVESTER.

1,200,096.  Specification of Letters Patent.  Patented Oct. 3, 1916.

Application filed June 16, 1913. Serial No. 773,841.

*To all whom it may concern:*

Be it known that I, ARTHUR H. FIRMAN, a citizen of the United States, residing at Los Angeles, in the county of Los Angeles and State of California, have invented new and useful Improvements in Kelp-Harvesters, of which the following is a specification.

This invention relates to apparatus for harvesting kelp.

The object of the invention is to provide a kelp harvester comprising a vessel or float capable of movement over the water, and having submerged cutters for cutting the kelp from the beds.

The invention consists of the parts and the construction and combination of parts as hereinafter more fully described and claimed, having reference to the accompanying drawings, in which—

Figure 1 is a longitudinal vertical section through a vessel, showing the essential parts of the present invention. Fig. 2 is a side elevation of the same. Fig. 3 is a plan of a portion of a horizontal cutter. Fig. 4 is a detail in partial section of the mounting for a vertical cutter.

A represents a boat or float of any appropriate description.

2 is a power shaft extending athwart ship, connected with any appropriate motive power near its center. Adjacent each end of the shaft 2 is a clutch 3 for engagement with a complementary clutch member 4 which connects with a corresponding wrist-pin 5 by which a vertical cutter 6 is operated in a manner shortly to be described. 7 are horizontal cutters which are also operated from shaft 2 by the following means: Power is transmitted from shaft 2 to the counter-shafts 8 by suitable means, as chains 9. Each counter-shaft 8 carries a clutch 10 operative in unison with a corresponding clutch 3 by any suitable clutch shifting mechanism. Each clutch 10 is adapted to engage a normally idle clutch member 11 connected to drive a beveled gear 12, which latter meshes a companion gear 13 on a vertical shaft 14 which latter carries respective horizontal cutters 7. Each shaft 14 is appropriately supported in a perpendicular tubing 15, held rigidly in position at the side of the boat by the brackets 16. The vertical cutters 6 are appropriately mounted for reciprocation on the guide tubing 15; as shown in Fig. 4, the ends of the vertical cutters 6 being mounted on sleeves 17, which slide up and down on the tubing 15. Any suitable means, not necessary to be shown, may be employed to prevent the sleeves 17 turning on the tubing 15. The vertical cutters 6 are connected with the respective wrist-pins 5 by means of the pitman 18. The horizontal cutters 7 are of any appropriate construction, preferably being of thin, flexible steel sharp on the cutting edge to separate the kelp in its revolving motion. The vertical cutters are serrated and are similar to any grain cutting apparatus and operated by direct reciprocating motion.

It will be understood that there is a horizontal cutter 7 and that there is a vertical cutter 6 at each side of the boat; the horizontal cutters extending underneath the boat, so that practically the entire area beneath the boat and to a considerable distance on each side of the vessel will be within the zone of the cutting apparatus. That is to say, in actual practice with a boat of a 10½ ft. beam, I have used cutters 12 ft. in diameter, thus giving a 24 ft. swath; the horizontal cutters being located at a depth of one fathom below the surface, and the vertical cutters being located about 12 ft. apart.

The foregoing construction constitutes a cutting apparatus which cuts the marine growth below the surface of the water horizontally; the perpendicular cutters separating the horizontal strands so as to free the kelp and allow its ultimate recovery.

By the term "floating support" employed in the claims, I mean any suitable barge, boat or float, either self-propelled or towed, or otherwise moved through the water and over the kelp beds.

Having thus described my invention what I claim and desire to secure by Letters Patent is—

1. In a kelp harvester, in combination with a floating support, a horizontal lower cutter on each side of the support, a vertical upper cutter on each side of the support coöperating with the respective horizontal cutters and means to operate the cutters.

2. In a kelp harvester in combination with a floating support, a horizontal submerged circular cutter borne by the support and a submerged vertical cutter also borne by the support in substantial alinement with the center of the horizontal cutter, and means for actuating the cutters.

3. In a kelp harvester, in combination with a floating support, a pair of submerged horizontal cutters arranged to underlie the support and to have parts that extend substantially thereacross and beyond the support sides, vertical cutters coöperating with said parts of the horizontal cutters that extend beyond the sides of the support and means to operate the cutters.

4. In a kelp harvester, the combination with a floating support, a pair of submerged horizontal cutters extending underneath the vessel from each side with means for supporting and operating the same from the vessel, and complementary vertical cutters at the side of the vessel, and means for operating them from the same source of power.

5. In a kelp harvester, in combination with a vessel, a pair of horizontal rotary cutters which underlie the vessel and extend across the beam and beyond the sides of the vessel, a vertical reciprocating cutter alined with the center of each of the rotary cutters, and means for operating all of the cutters.

6. In a kelp harvester, a vertically reciprocatory cutter, a horizontal rotary cutter underlying the lower end of the vertical cutter, and means to actuate said cutters in unison.

7. In a kelp harvester, a vertical shaft, a horizontal cutter on the lower end of said shaft, a tubular member surrounding said shaft, sleeves vertically reciprocable on said member, a vertical cutter connected to said sleeves, means to reciprocate said vertical cutter on said tubular member, and means to rotate said shaft within said tubular member.

8. In a kelp harvester, a rotatable horizontal cutter, a vertically reciprocable cutter, and a member which both rotatably supports said horizontal cutter and slidably supports said vertical cutter, and means to actuate the cutters.

9. In a kelp harvester for vessels, a pair of submerged rotary cutters horizontally disposed and arranged so that they extend throughout the extent of the beam of the vessel.

10. In a kelp harvester for vessels, a pair of rotary cutters horizontally disposed and arranged so that they extend throughout the extent of the beam of the vessel, and a pair of vertically reciprocal cutters mounted on opposite sides of the vessel.

11. In a kelp harvester for vessels, a pair of rotary cutters horizontally disposed and arranged so that they extend throughout the extent of the beam of the vessel, and a pair of vertically reciprocal cutters mounted on opposite sides of the vessel, and arranged at the centers of the rotary cutters.

12. In a kelp harvester for vessels, horizontal rotary cutters extending throughout the extent of the vessel beam, and vertical cutters at the sides of the vessel and arranged over the horizontal cutters.

In testimony whereof I have hereunto set my hand in the presence of two subscribing witnesses.

ARTHUR H. FIRMAN.

Witnesses:
R. M. MARSHALL,
LAURETTA DAVLIN.

Copies of this patent may be obtained for five cents each, by addressing the "Commissioner of Patents, Washington, D. C."